(12) United States Patent  
Sakakibara et al.

(10) Patent No.: US 9,180,828 B2  
(45) Date of Patent: Nov. 10, 2015

(54) VEHICLE BODY FRONT STRUCTURE

(71) Applicant: Toyota Jidosha Kabushiki Kaisha, Toyota-shi Aichi-ken (JP)

(72) Inventors: Kosuke Sakakibara, Toyota (JP); Masanobu Omi, Kasugai (JP); Akihiro Tamaoki, Tajimi (JP); Tomoyuki Kuriyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/288,897

(22) Filed: May 28, 2014

(65) Prior Publication Data

US 2014/0361559 A1 Dec. 11, 2014

(30) Foreign Application Priority Data

Jun. 5, 2013 (JP) ................................ 2013-119314

(51) Int. Cl.  
*B60R 19/34* (2006.01)

(52) U.S. Cl.  
CPC ..................................... *B60R 19/34* (2013.01)

(58) Field of Classification Search  
CPC ............ B60R 19/34; B60R 2021/0004; B60R 2021/0009; B60R 2021/0025; B60R 2021/0023  
USPC ............. 293/132, 133, 154, 155; 296/187.04, 296/187.09, 203.02  
See application file for complete search history.

(56) References Cited

U.S. PATENT DOCUMENTS

| | | | |
|---|---|---|---|
| 8,608,231 B1* | 12/2013 | Mendivil et al. | 296/187.03 |
| 8,857,902 B2* | 10/2014 | Sekiguchi et al. | 296/193.09 |
| 8,919,835 B1* | 12/2014 | Han et al. | 293/133 |
| 2012/0248820 A1* | 10/2012 | Yasui et al. | 296/187.09 |
| 2014/0062106 A1* | 3/2014 | Han | 293/133 |
| 2014/0091585 A1* | 4/2014 | Ramoutar et al. | 293/133 |
| 2014/0117717 A1* | 5/2014 | Parkila et al. | 296/187.09 |
| 2014/0361559 A1* | 12/2014 | Sakakibara et al. | 293/133 |
| 2014/0361560 A1* | 12/2014 | Sakakibara et al. | 293/133 |
| 2015/0035316 A1* | 2/2015 | Kuriyama et al. | 296/187.1 |

FOREIGN PATENT DOCUMENTS

JP 2012-228907 A 11/2012

* cited by examiner

*Primary Examiner* — Gregory Blankenship  
(74) *Attorney, Agent, or Firm* — Dinsmore & Shohl LLP (57) ABSTRACT

In a vehicle body front structure, a crash box provided in a front part of a front side member is broken by applying pressure due to a collision load, so that a second load transmission member moves backward toward a first load transmission member. This allows the second load transmission member to abut with the first load transmission member, thereby making it possible to transmit the collision load input into the second load transmission member, to a body portion of the front side member via the first load transmission member. Besides, since the second load transmission member is not provided in a bumper reinforcement, it is possible to replace the bumper reinforcement separately from the second load transmission member.

9 Claims, 7 Drawing Sheets

VEHICLE BODY FRONT STRUCTURE

INCORPORATION BY REFERENCE

The disclosure of Japanese Patent Application No. 2013-119314 filed on Jun. 5, 2013 including the specification, drawings and abstract is incorporated herein by reference in its entirety.

BACKGROUND OF THE INVENTION

1. Field of the Invention

The present invention relates to a vehicle body front structure.

2. Description of Related Art

In a vehicle body front structure of a vehicle described in Japanese Patent Application Publication No. 2012-228907 (JP 2012-228907 A), a side impact beam is provided with a first projecting portion extending outwardly in a vehicle-width direction from its side portion. Further, a bumper beam is provided with bumper-beam extension portions extending outwardly in the vehicle-width direction from right and left side portions thereof. The bumper-beam extension portion includes a second projecting portion extending in a vehicle-body rearward direction toward the first projecting portion of the side impact beam.

In the vehicle body front structure as described above, when that outside part of a vehicle body front portion which is placed on an outer side relative to the side impact beam in the vehicle-body width direction collides head-on into a collision object such as other vehicles (in a case of a so-called short overlap collision), the bumper-beam extension portion moves backward due to a collision load, which allows the second projecting portion to abut with the first projecting portion of the side impact beam. Hereby, the collision load to the bumper-beam extension portion can be efficiently transmitted to the side impact beam via the second projecting portion and the first projecting portion, thereby making it possible to effectively absorb an impact energy by effectively deforming the side impact beam.

However, in the vehicle body front structure as described above, the second projecting portion is provided in the bumper-beam extension portion. In view of this, when the bumper-beam extension portion is replaced, it is necessary to replace the second projecting portion at the same time. Thus, there is room for improvement in terms of reducing repair cost.

SUMMARY OF THE INVENTION

The present invention provides a vehicle body front structure which is able to efficiently transmit, to a body portion of a front side member, a collision load input from a vehicle-body front side into an outside part of a vehicle body front portion in a vehicle-body width direction, and which is able to contribute to a reduction of repair cost.

A vehicle body front structure according to one aspect of the invention includes: a front side member disposed on a side portion of a vehicle body front portion such that longitudinal direction of the front side member is in coincidence with a vehicle-body front-rear direction, the front side member being provided with a impact absorption portion in a front part of its body portion, the impact absorption portion being vulnerable in a vehicle-body front-rear direction; a bumper reinforcement disposed on the vehicle body front portion such that longitudinal direction of the front side member is in coincidence with a vehicle-body width direction, the bumper reinforcement being fixed to a front end of the front side member; a first load transmission member projecting outwardly in the vehicle-body width direction from the front side member, at a vehicle-body rear side of the impact absorption portion; and a second load transmission member projecting outwardly in the vehicle-body width direction from the front side member, at a vehicle-body front side of the impact absorption portion.

According to the one aspect of the invention, when a collision load is input from the vehicle-body front side into an outside part of the vehicle body front portion in the vehicle-body width direction, the impact absorption portion provided in the front part of the body portion of the front side member is broken by applying pressure in the vehicle-body front-rear direction, so that the second load transmission member moves backward toward the first load transmission member (a vehicle-body rear side). This allows the second load transmission member to abut with the first load transmission member, thereby making it possible to transmit the collision load input into the second load transmission member, to a body portion of the front side member via the first load transmission member. As a result, the number of transmission paths of the collision load to the body portion of the front side member is increased, thereby making it possible to improve a transmission efficiency of the collision load to the body portion of the front side member. Besides, since the second load transmission member is not provided in the bumper reinforcement, it is possible to replace the bumper reinforcement separately from the second load transmission member. This can accordingly contribute to a reduction of repair cost.

In the vehicle body front structure, the second load transmission member may include a fixed portion fixed to a side-member connection portion provided in the bumper reinforcement and the impact absorption portion so as to be sandwiched the side-member connection portion and the impact absorption portion.

Since the second load transmission member has the fixed portion as described above, it is possible for a fixing structure of the second load transmission member to be simple and strong. Further, it is possible to prevent the fixing structure of the second load transmission member from affecting an impact absorption stroke of the impact absorption portion.

In the vehicle body front structure, the second load transmission member may include a load transmission portion provided outwardly in the vehicle-body width direction relative to the fixed portion, the load transmission portion being set longer in a size in the vehicle-body front-rear direction than the fixed portion.

Since the second load transmission member includes the load transmission portion as described above, it is possible to transmit the collision load from the vehicle-body front side to the first load transmission member promptly.

In the vehicle body front structure, the second load transmission member may include an intermediate portion provided between the fixed portion and the load transmission portion so as to connect them, the intermediate portion having a rigidity set lower than that of the load transmission portion.

Since the second load transmission member has the intermediate portion as described above, when the intermediate portion is deformed by the collision load from the vehicle-body front side, it is possible to displace (rotate) the load transmission portion toward the vehicle-body rear side and toward an inner side in the vehicle-body width direction. Accordingly, even in a case where the size of the load transmission portion in the vehicle-body front-rear direction is set short, it is possible to cause the load transmission portion to abut with the first load transmission member due to the displacement. This makes it possible to achieve downsizing of the second load transmission member.

In the vehicle body front structure, the vehicle body front structure may be configured to form a gap between the load transmission portion and the front side member.

Since such a gap is formed, when the load transmission portion of the second load transmission member is displaced toward the vehicle-body rear side and toward the inner side in the vehicle-body width direction as mentioned above, it is possible to prevent the load transmission portion from interfering with the front side member needlessly.

In the vehicle body front structure, a rear face of the first load transmission member may be inclined so as to be facing toward the vehicle-body rear side as the rear face of the first load transmission member goes inwardly in the vehicle-body width direction.

In the vehicle body front structure, the first load transmission member may be formed in a right angled triangle in a plane view.

When the front side member is bent inwardly in the vehicle-body width direction due to a collision load input into the first load transmission member, a rear end of the first load transmission member serves as a starting point. In terms of this, according to such a configuration, even in a case where the rear end of the first load transmission member is disposed closer to the vehicle-body rear side so that a bending portion of the front side member is caused to abut with a power unit or the like, it is possible to restrain upsizing of the first load transmission member.

As described above, in the vehicle body front structure according to the one aspect of the invention, it is possible to efficiently transmit, to the body portion of the front side member, the collision load input from the vehicle-body front side into the outside part of the vehicle body front portion in the vehicle-body width direction, and it is also possible to contribute to a reduction of repair cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

The following describes a vehicle body front structure 10 according to a first embodiment of the present invention with reference to FIGS. 1 to 4. Note that an arrow FR, an arrow UP, and an arrow OUT, which are shown appropriately in each figure, indicate a vehicle front direction (a traveling direction), an upper direction, and an outer side in a vehicle-body width direction, respectively. Hereinafter, in a case where a description is made by use of merely front and rear directions and up and down directions, they indicate front and rear of a vehicle-body front-rear direction, and up and down of a vehicle-body up-down direction, respectively, unless otherwise specified.

Configuration

The vehicle body front structure 10 illustrated in FIGS. 1 to 4 is applied to a vehicle body of a sedan-type automobile, for example, and includes a pair of right and left front side members 12. The right and left front side members 12 are frame members for the vehicle body which frame members are formed to have a rectangular closed section when viewed from a vehicle-body front-rear direction, and are disposed on respective sides of a vehicle body front portion such that longitudinal directions of the front side members 12 are in coincidence with the vehicle-body front-rear direction. Note that the vehicle body front structure 10 is configured in a symmetrical manner, so that a right side of the vehicle body is not illustrated in FIGS. 1 to 4.

Figure 1:
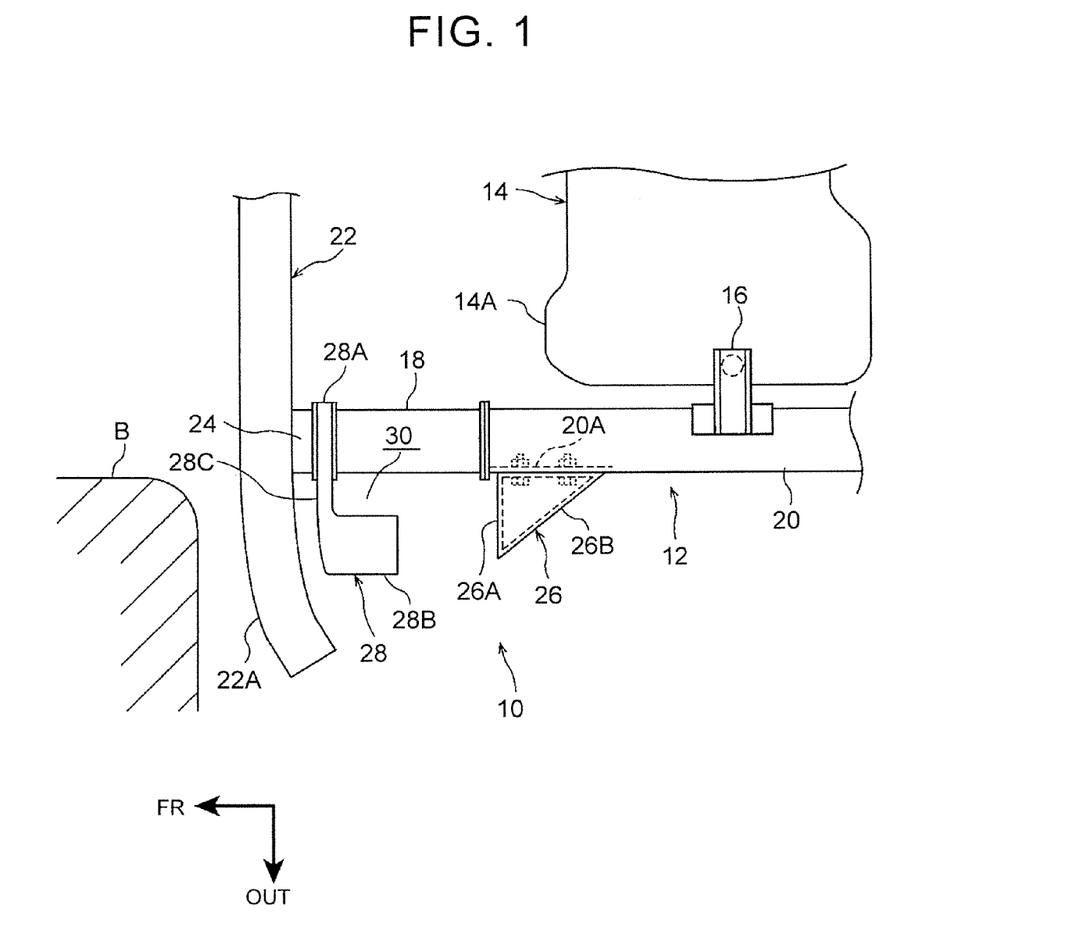
FIG. 1 is a plane view illustrating a partial configuration of a vehicle body front structure according to a first embodiment of the present invention.
Figure 2:
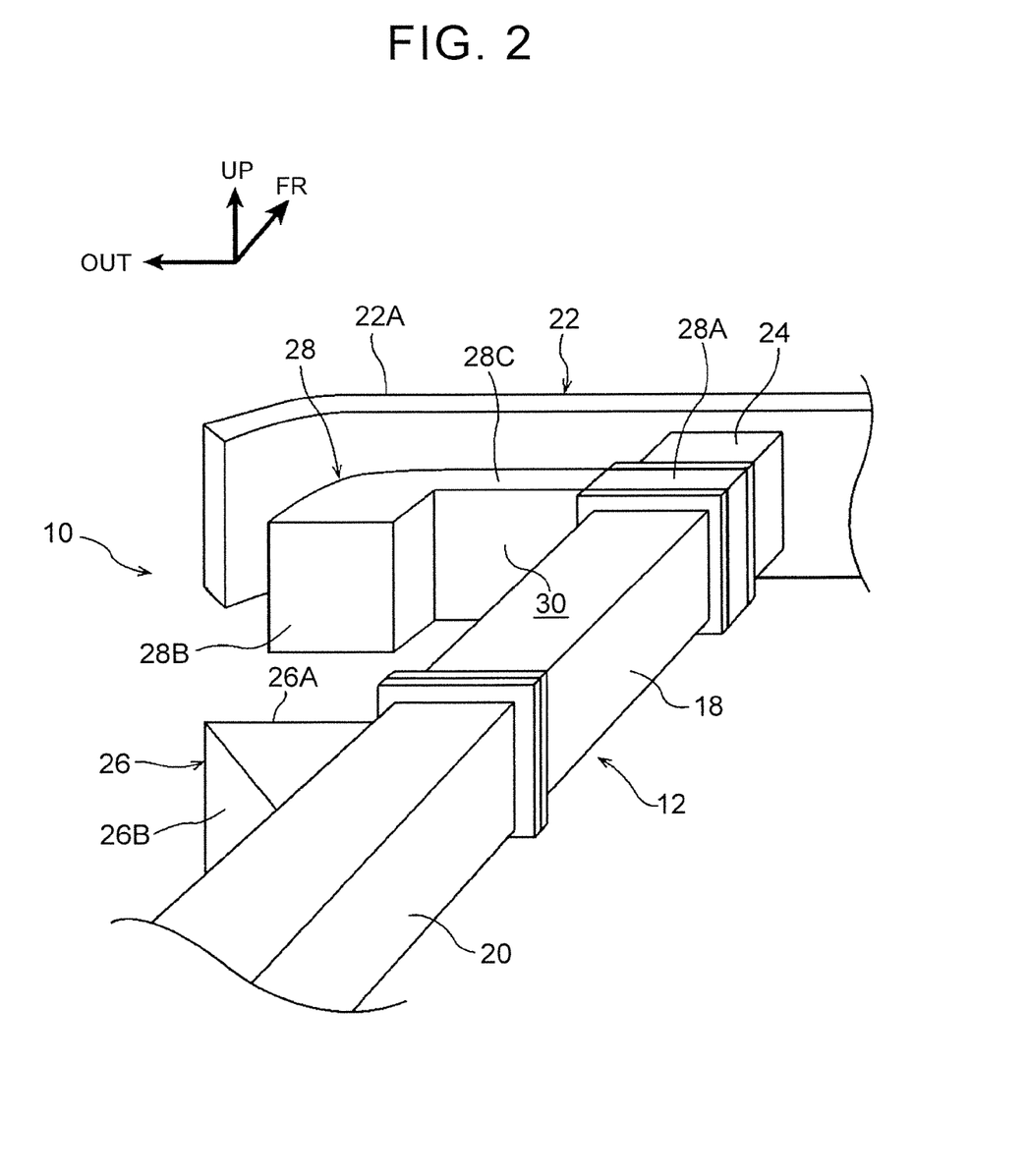
FIG. 2 is a perspective view in which the vehicle body front structure is viewed from a vehicle-body rear side.

A power unit 14 is disposed between the right and left front side members 12. The power unit 14 is configured to include an engine and a transmission in the present embodiment, and is supported by the right and left front side members 12 via an engine mount 16. Although not illustrated herein, respective front wheels of the vehicle are disposed on respective sides opposite to the power unit 14 via the right and left front side members 12.

Crash boxes 18 as impact absorption portions (low-rigid portions: vulnerable portions) are provided in respective front parts of the right and left front side members 12. The crash boxes 18 are formed separately from body portions 20 of the front side members 12, and are fixed to front ends of the body portions 20 by means of bolt fastening or the like.

The right and left crash boxes 18 are formed to have a rectangular closed section when viewed from the vehicle-body front-rear direction, for example, and are formed in a more vulnerable manner than the body portions 20. More specifically, the crash boxes 18 have a lower rigidity (offset yield strength) with respect to an axial compression load along the vehicle-body front-rear direction, than that of the body portions 20, and are configured to absorb energy, at the time of a head-on collision of the vehicle, such that the crash boxes 18 are deformed before the body portions 20 are deformed.

A bumper reinforcement 22 is fixed to front ends of the right and left crash boxes 18 via the after-mentioned second load transmission members 28. The bumper reinforcement 22 is disposed on the vehicle body front portion such that longitudinal direction of the bumper reinforcement 22 is in coincidence with the vehicle-body width direction. Note that, a side-member connection portion 24 for fixing the front end (that is, a front end of the front side member 12) of the crash box 18 thereto via the second load transmission member 28 is provided on a rear face of the bumper reinforcement 22 so as to project toward a vehicle-body rear side. The side-member connection portion 24 is fixed to the rear face of the bumper reinforcement 22 by welding, for example.

The bumper reinforcement 22 is a so-called B-shaped section type of which a sectional shape viewed from the vehicle-body width direction is formed in a generally B shape, and includes right and left bumper extending portions 22A extending outwardly in the vehicle-body width direction relative to the right and left crash boxes 18. The right and left bumper extending portions 22A are curved gently toward the vehicle-body rear side as they go outwardly in the vehicle-body width direction. Although not illustrated herein, an absorber (a cushioning material) made from a foam material or the like is attached to a front end face of the bumper reinforcement 22, and the absorber and the bumper reinforcement 22 are covered with a bumper cover.

In the meantime, a first load transmission member 26 (gusset) as a first load transmission member is attached to a front end part of the body portion 20, at a vehicle-body rear side of the bumper extending portion 22A. The first load transmission member 26 is formed, for example, from a metallic material in a shape of a hollow triangle pole, and projects outwardly in the vehicle-body width direction from the front end part of the body portion 20, at a vehicle-body rear side of the crash box 18 (projects outwardly in the vehicle-body width direction from the vehicle-body rear side of the crash box 18 in the front side member 12).

The first load transmission member 26 is fixed by fastening via fasteners such as bolt and nut, for example, to an outer wall 20A, which is an outer wall portion of the body portion 20 in the vehicle-body width direction. Note that a material (quality of material) of the first load transmission member 26 is not limited to metal, and may be resin, for example. Further, a fixation method of the first load transmission member 26 to the front side member 12 is not limited to the fastening, and various methods such as welding, adhesion, and rivet fastening can be used. Further, the first load transmission member 26 may be configured to be formed integrally with the body portion 20 of the front side member 12.

The first load transmission member 26 is formed in a right angled triangle in a plane view. While a front face 26A thereof is disposed along the vehicle-body width direction, a rear face 26B thereof is inclined so as to be facing toward the vehicle-body rear side as the rear face 26B goes inwardly in the vehicle-body width direction. An inner end (a rear end part) of the rear face 26B in the vehicle-body width direction is placed on a vehicle-body rear side relative to a vehicle-body front-side end part 14A of the power unit 14 in a plane view, and on a vehicle-body front side relative to a generally center part (the engine mount 16) of the power unit 14 in the vehicle-body front-rear direction.

Further, in the present embodiment, the second load transmission member 28 is provided at a vehicle-body front side of the first load transmission member 26 and at a vehicle-body rear side of the bumper reinforcement 22. The second load transmission member 28 is formed, for example, from a metallic material generally in an L shape in a plane view, and projects outwardly in the vehicle-body width direction from the front side member 12, at a vehicle-body front side of the crash box 18 (projects outwardly in the vehicle-body width direction from the vehicle-body front side of the crash box 18 in the front side member 12).

More specifically, the second load transmission member 28 is constituted by: a fixed portion 28A fixed to the side-member connection portion 24 of the bumper reinforcement and the crash box 18 so as to be sandwiched therebetween; a load transmission portion 28B provided outwardly in the vehicle-body width direction relative to the fixed portion 28A and set longer in a size in the vehicle-body front-rear direction than the fixed portion 28A; and an intermediate portion 28C provided between the fixed portion 28A and the load transmission portion 28B so as to connect them.

The fixed portion 28A is fixed to a front end of the crash box 18 and a rear end of the side-member connection portion 24 by means of bolt fastening or the like. Further, the load transmission portion 28B projects toward the vehicle-body rear side relative to the fixed portion 28A, and a gap 30 is formed between the load transmission portion 28B and the crash box 18. The load transmission portion 28B is formed generally in a quadrangular shape in a plane view in the present embodiment. Further, a rigidity of the intermediate portion 28C with respect to a load from the vehicle-body front side is set lower than that of the load transmission portion 28B. A method for reducing the rigidity of the intermediate portion 28C may be, for example, a method in which a thickness of the second load transmission member 28 is thinned in a part corresponding to the intermediate portion 28C, a method in which a material having a low rigidity is used for the part corresponding to the intermediate portion 28C, a method in which a bead along the up-down direction is provided in the intermediate portion 28C, or the like method. Note that a material (quality of material) of the second load transmission member 28 is not limited to metal, and may be resin, for example.

Figure 3:
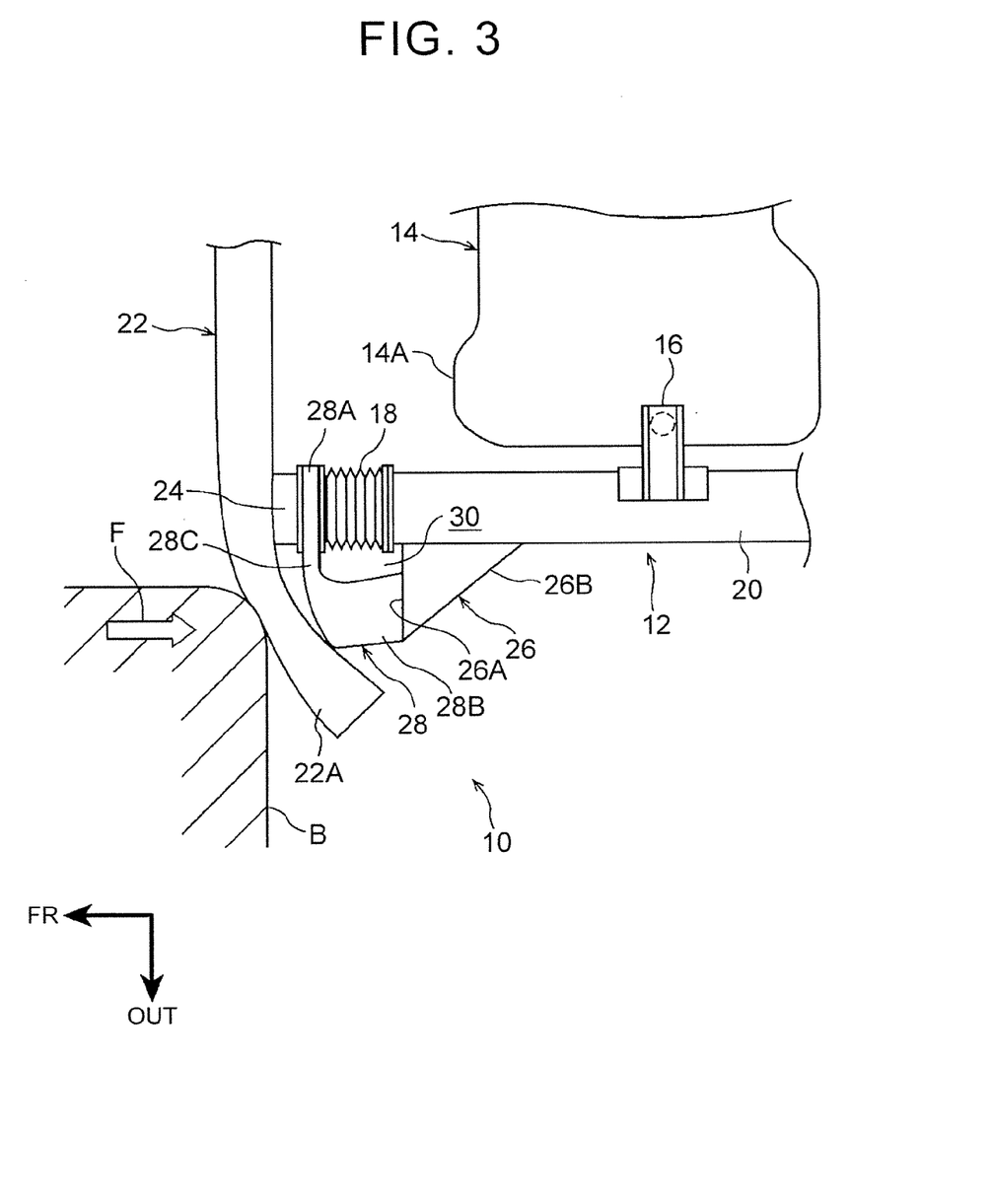
FIG. 3 is a plane view illustrating a state where a second load transmission member abuts with a first load transmission member in the vehicle body front structure.

Here, in the present embodiment, when an outside part of the vehicle body front portion in the vehicle-width direction, relative to the front side member 12, collides head-on into a collision object (herein, a barrier B) such as other vehicles (in a case of a so-called short overlap collision), the crash box 18 is deformed in an axially compressive manner in the vehicle-body front-rear direction due to a collision load F from the vehicle-body front side, as illustrated in FIG. 3, so that the second load transmission member 28 moves backward toward the first load transmission member 26. Further, the bumper extending portion 22A is bent toward the vehicle-body rear side and collides against the second load transmission member 28, so that the second load transmission member 28 is bent at the intermediate portion 28C. Hereby, the load transmission portion 28B of the second load transmission member 28 abuts (collides) with the front face 26A of the first load transmission member 26.

That is, in the present embodiment, a linear dimension of the load transmission portion 28B in the vehicle-body front-rear direction and a disposition position of the first load transmission member 26 are set so that, the crash box 18 is deformed in an axially compressive manner and thereby the second load transmission member 28 is bent at the intermediate portion 28C, the load transmission portion 28B abuts with the front face 26A of the first load transmission member 26.

Since an offset yield strength of the crash box 18 with respect to the collision load F is set lower than that of the bumper reinforcement 22, the crash box 18 is deformed earlier than the bumper extending portion 22A in general. Further, depending on a collision form, the crash box 18 may be buckled without being deformed in an axially compressive manner. However, in the present embodiment, the crash box 18 is configured so that its deformation is not obstructed by the abutment of the second load transmission member 28 with the first load transmission member 26.

Operations and Effects

Next will be described operations and effects of the first embodiment.

In the vehicle body front structure 10 configured as described above, when the collision load F is input from the vehicle-body front side into the outside part of the vehicle body front portion in the vehicle-body width direction, the crash box 18 provided in the front part of the front side member 12 is broken by applying pressure in the vehicle-body front-rear direction, so that the second load transmission member 28 moves backward toward the first load transmission member 26 (the vehicle-body rear side). This allows the second load transmission member 28 to abut with the first load transmission member 26, thereby making it possible to transmit the collision load F input into the second load transmission member 28, to the body portion 20 of the front side member 12 via the first load transmission member 26. As a result, the number of transmission paths of the collision load F to the body portion 20 is increased, thereby making it possible to improve a transmission efficiency of the collision load F to the body portion 20.

Besides, since the second load transmission member 28 is not provided in the bumper reinforcement 22, it is possible to replace the bumper reinforcement 22 separately from the second load transmission member 28. This can accordingly contribute to a reduction of repair cost. Further, since the first load transmission member 26 and the second load transmission member 28 in the present embodiment can be attached to an existing vehicle later, it is possible to improve collision safety performance of the existing vehicle at low cost.

Further, in the present embodiment, the bumper extending portion 22A bent toward the vehicle-body rear side makes slide contact with the barrier B, so that it is possible to act a force on the vehicle body to move away from the barrier B in a lateral direction (the vehicle-body width direction). As a result, it is possible to effectively reduce the collision load F input into the vehicle body form the barrier B, thereby making it possible to largely restrain a deformation of a vehicle interior (a cabin).

Further, in the present embodiment, the fixed portion 28A of the second load transmission member 28 is fixed to the side-member connection portion 24 of the bumper reinforcement 22 and the crash box 18 so as to be sandwiched therebetween. This allows a fixing structure of the second load transmission member 28 to be simple and strong. Further, it is possible to prevent the fixing structure of the second load transmission member 28 from affecting an impact absorption stroke of the crash box 18.

Further, since the second load transmission member 28 includes the load transmission portion 28B that is set longer in the size in the vehicle-body front-rear direction than the fixed portion 28A, it is possible to transmit the collision load F from the vehicle-body front side to the first load transmission member 26 promptly.

Further, the second load transmission member 28 includes the intermediate portion 28C which is provided between the fixed portion 28A and the load transmission portion 28B so as to connect them and which has a rigidity set lower than that of the load transmission portion 28B. Hereby, when the intermediate portion 28C is deformed by the collision load F, it is possible to displace (rotate) the load transmission portion 28B toward the vehicle-body rear side and toward an inner side in the vehicle-body width direction. Accordingly, even in a case where the size of the load transmission portion 28B in the vehicle-body front-rear direction is set short, it is possible to cause the load transmission portion 28B to abut with the first load transmission member 26 due to the displacement. This makes it possible to achieve downsizing of the second load transmission member 28.

Further, in the second load transmission member 28, the gap 30 is formed between the load transmission portion 28B and the front side member 12. Accordingly, when the load transmission portion 28B of the second load transmission member 28 is displaced toward the vehicle-body rear side and toward the inner side in the vehicle-body width direction as mentioned above, it is possible to prevent the load transmission portion 28B from interfering with the front side member 12 needlessly.

Figure 4:
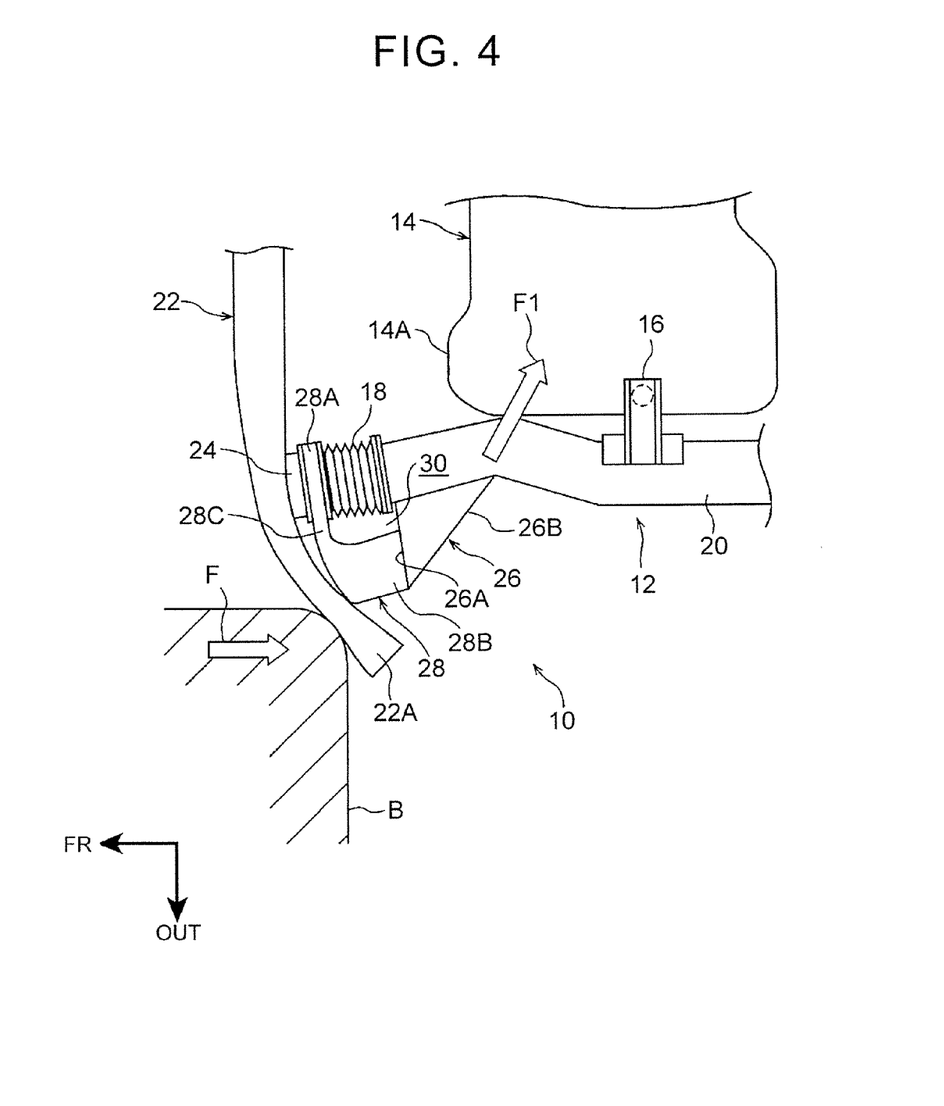
FIG. 4 is a plane view illustrating a state where a body portion of a front side member is bent due to a collision load to the first load transmission member in the vehicle body front structure.

Further, in the present embodiment, the first load transmission member 26 is provided so as to project outwardly in the vehicle-body width direction from the front end part of the body portion 20 of the front side member 12. Accordingly, when the collision load F is input from the vehicle-body front side to the first load transmission member 26, a bending moment acts on the body portion 20. As a result, as illustrated in FIG. 4, it is possible for the body portion 20 to be bent inwardly in the vehicle-body width direction to abut with the power unit 14. This makes it possible to disperse part of the collision load F to that side of the vehicle body which is opposite to a collision side, via the power unit 14 (see an arrow F1 in FIG. 4).

Besides, the rear face 26B of the first load transmission member 26 fixed to the front end part of the body portion 20 is inclined so as to be facing toward the vehicle-body rear side as the rear face 26B goes inwardly in the vehicle-body width direction. Accordingly, even in a configuration in which that rear end of the first load transmission member 26 which serves as a starting point of bending of the front side member 12 is disposed lateral to the power unit 14, it is possible to restrain upsizing of the first load transmission member 26.

Next will be described another embodiment of the present invention. Note that a configuration/operation basically similar to a configuration/operation of the first embodiment has the same sign as in the first embodiment, and its description is omitted.

Second Embodiment

Figure 5:
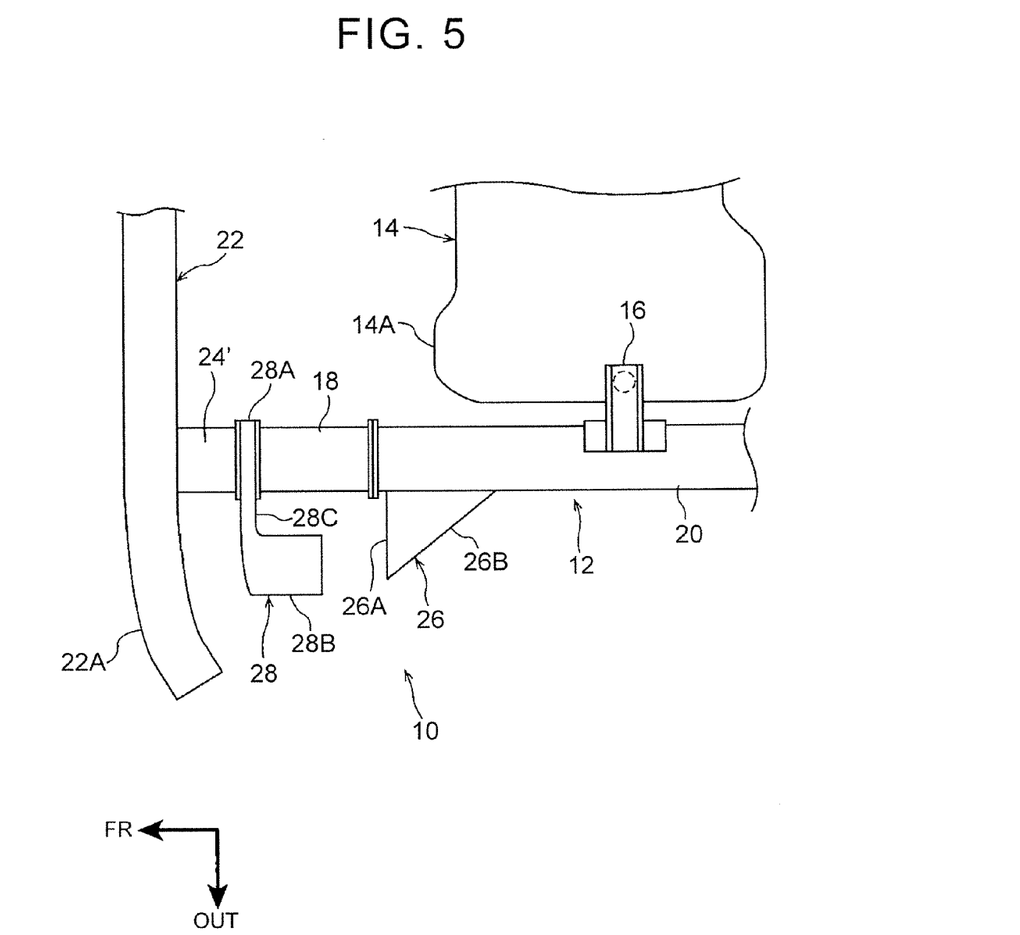
FIG. 5 is a plane view illustrating a partial configuration of a vehicle body front structure according to a second embodiment of the present invention.

FIG. 5 is a plan view illustrating a vehicle body front structure 10 according to a second embodiment of the present invention. This embodiment is different from the first embodiment in that a side-member connection portion 24' of a bumper reinforcement 22 has an impact absorption property (vulnerability) similar to a crash box 18. That is, in this embodiment, a fixed portion 28A of a second load transmission member 28 is fixed between an impact absorption portion (the side-member connection portion 24') provided in the bumper reinforcement 22 and an impact absorption portion (a crash box 18) provided in a front part of a front side member 12. In this embodiment, when the side-member connection portion 24' and the crash box 18 are broken by applying pressure in a vehicle-body front-rear direction due to a collision load F from a vehicle-body front side, the second load transmission member 28 is configured to abut with a first load transmission member 26. Even in this embodiment, it is possible to obtain basically the same effect as the first embodiment.

Supplementary Description of Embodiments

Figure 6A:
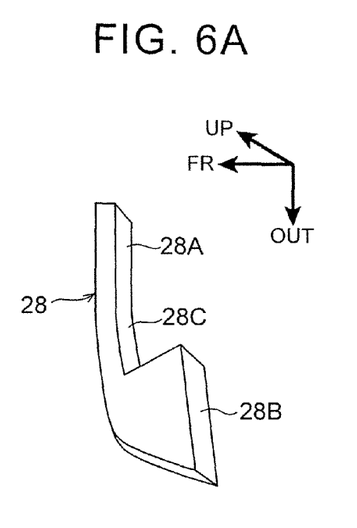
FIG. 6A is a perspective view illustrating a modified example of the second load transmission member (a configuration in which a load transmission portion is formed in a trapezoidal shape in a plane view)

In each of the above embodiments, the load transmission portion 28B of the second load transmission member 28 is configured to be formed in a quadrangular shape in a plane view. However, the present invention is not limited to this, and the shape of the second load transmission member 28 can be changed appropriately. For example, as illustrated in FIG. 6A, the load transmission portion 28B may be configured to be formed in a trapezoidal shape in a plane view. In this example, since the rear face of the load transmission portion 28B is large, it is possible to cause the rear face of the load transmission portion 28B to successfully abut with the front face 26A of the first load transmission member 26.

Figure 6B:
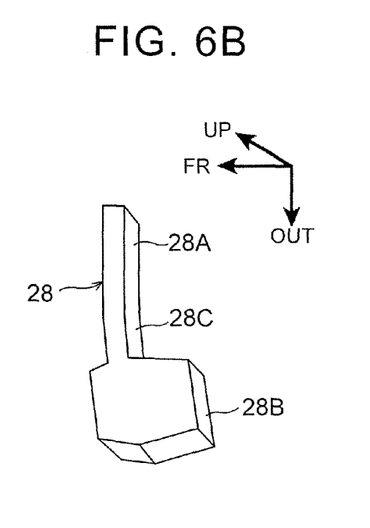
FIG. 6B is a perspective view illustrating a modified example of the second load transmission member (a configuration in which a front part of the load transmission portion projects toward a vehicle-body front side, relative to an intermediate portion)

Further, for example, as illustrated in FIG. 6B, a front part of the load transmission portion 28B may be configured to project toward the vehicle-body front side, relative to the intermediate portion 28C. In this example, it is possible to cause the bumper extending portion 22A to abut with the load transmission portion 28B promptly, thereby making it possible to promptly move the load transmission portion 28B backward toward the vehicle-body rear side, so as to abut with the first load transmission member 26.

Figure 6C:
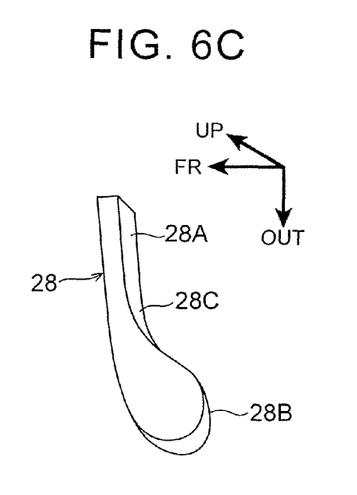
FIG. 6C is a perspective view illustrating a modified example of the second load transmission member (a configuration in which no step is formed between the intermediate portion and the load transmission portion)
Figure 6D:
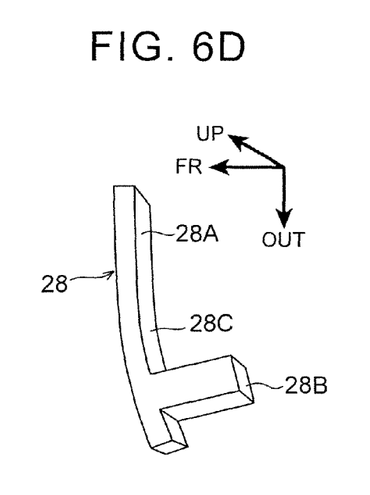
FIG. 6D is a perspective view illustrating a modified example of the second load transmission member (a configuration in which a load transmission portion 28B is not provided on an outer end of a second load transmission member 28 in a vehicle-body width direction)

Further, for example, as illustrated in FIG. 6C, no step may be provided between the intermediate portion 28C and the load transmission portion 28B, or as illustrated in FIG. 6D, the load transmission portion 28B may not be provided on an outer end of the second load transmission member 28 in the vehicle-body width direction.

Further, in each of the above embodiments, the first load transmission member 26 is configured to be formed in a right angled triangle in a plane view. However, the present invention is not limited to this, and it is possible to set and change the shape of the first load transmission member 26 appropriately. For example, as illustrated in FIG. 7A, the first load transmission member 26 may be configured to be formed in a trapezoidal shape in a plane view.

Figures 7A, 7B:
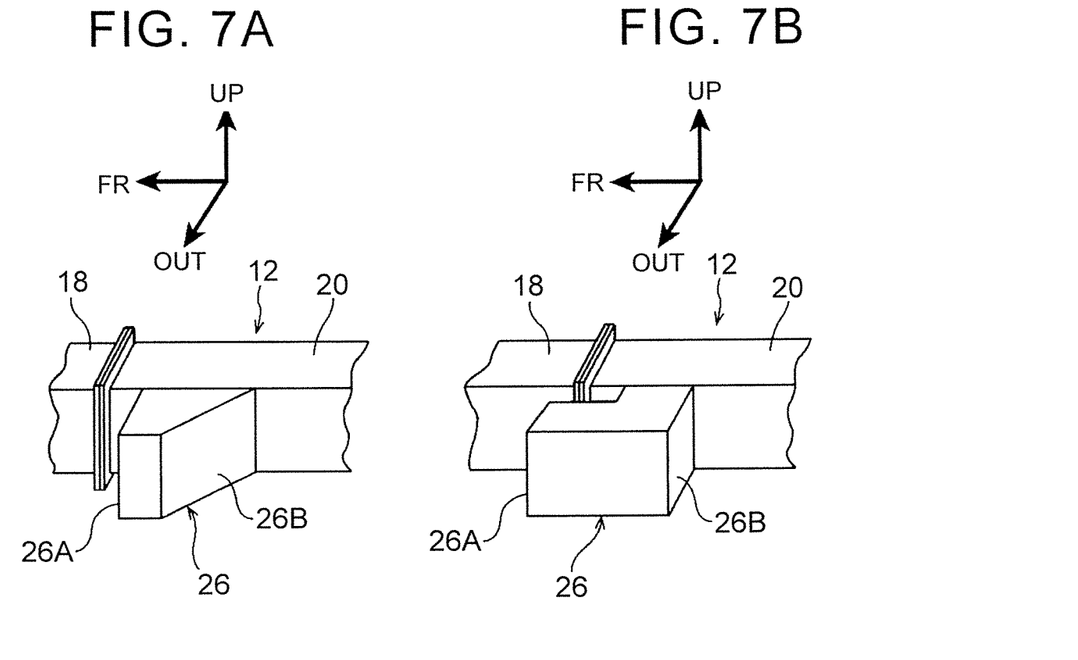
FIG. 7A is a perspective view illustrating a modified example of the first load transmission member (a configuration in which the first load transmission member is formed in a trapezoidal shape in a plane view)
FIG. 7B is a perspective view illustrating a modified example of the first load transmission member (a configuration in which the first load transmission member extends toward a vehicle-body front side)

Further, for example, as illustrated in FIG. 7B, the first load transmission member 26 may be configured to extend toward the vehicle-body front side. In this example, it is possible for the second load transmission member 28 to abut with the first load transmission member 26 promptly.

Figure 7C:
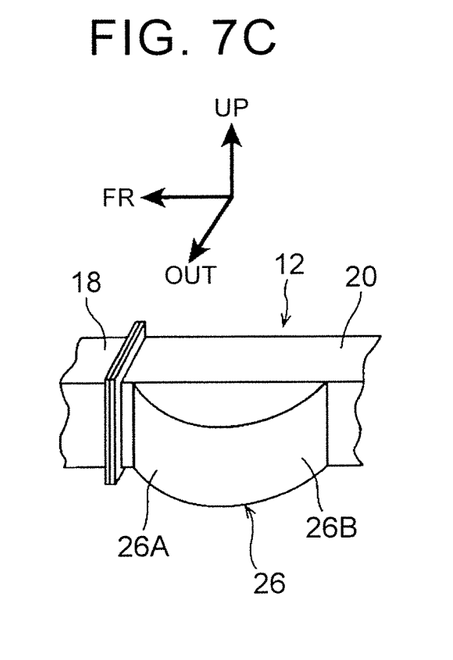
FIG. 7C is a perspective view illustrating a modified example of the first load transmission member (a configuration in which the first load transmission member is formed in a semicircular shape in a plane view)

Further, for example, as illustrated in FIG. 7C, the first load transmission member 26 may be configured to be formed in a semicircular shape in a plane view. Even in this example, since the rear face 26B of the first load transmission member 26 is inclined so as to be facing toward the vehicle-body rear side as the rear face 26B goes inwardly in the vehicle-body width direction, it is possible to obtain the same effect as in each of the embodiments.

Figure 7D:
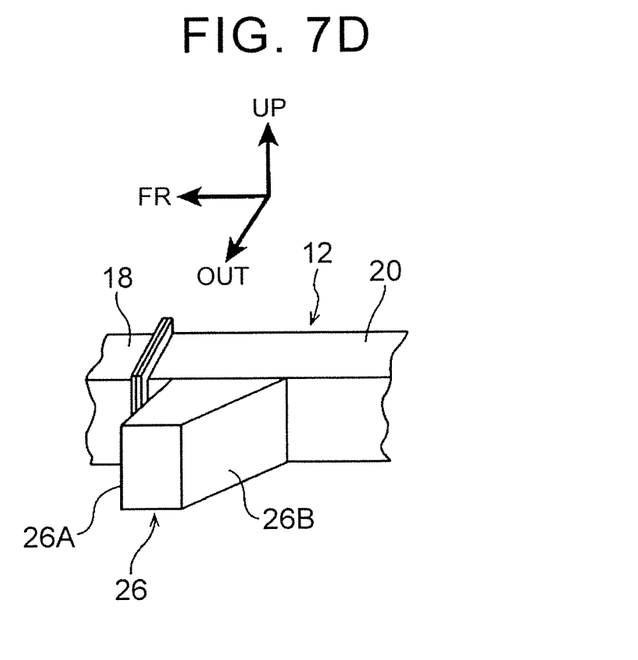
FIG. 7D is a perspective view illustrating a modified example of the first load transmission member (a configuration in which a front face of the first load transmission member is inclined toward a vehicle-body rear side as it goes inwardly in a vehicle-body width direction).

Further, for example, as illustrated in FIG. 7D, the front face 26A of the first load transmission member 26 may be configured to be inclined so as to be facing toward the vehicle-body rear side as the front face 26A goes inwardly in the vehicle-body width direction. In this example, in a state where the second load transmission member 28 abuts with the front face 26A of the first load transmission member 26, the front face 26A interferes with a rear end of the second load transmission member 28, thereby preventing such an abutment state therebetween from being released needlessly.

Further, in each of the above embodiments, the crash box 18 as the impact absorption portion is configured to be connected to the body portion 20 of the front side member 12. However, the present invention is not limited to this, and the shock absorption portion may be configured to be provided integrally with the front part of the front side member.

Further, the second load transmission member 28 in each of the embodiments is configured such that the gap 30 is formed between the load transmission portion 28B and the crash box 18 of the front side member 12. However, the present invention is not limited to this, and the load transmission portion 28B may be configured to make contact with a side surface of the crash box 18.

Further, the second load transmission member 28 in each of the embodiments is configured such that the intermediate portion 28C is provided between the fixed portion 28A and the load transmission portion 28B. However, the present invention is not limited to this, and may be configured such that the intermediate portion 28C is omitted.

Further, in each of the above embodiments, the fixed portion 28A of the second load transmission member 28 is configured to be fixed to the side-member connection portion 24 of the bumper reinforcement 22 and the crash box 18 so as to be sandwiched therebetween. However, the present invention is not limited to this, and a fixing structure of the second load transmission member to the front side member can be modified appropriately.

Further, in each of the above embodiments, the load transmission portion 28B of the second load transmission member 28 is configured to be set longer in the size in the vehicle-body front-rear direction than the fixed portion 28A. However, the present invention is not limited to this. For example, in a case where the first load transmission member 26 has a shape as illustrated in FIG. 7B, the load transmission portion and the fixed portion may be set to have the same size in the vehicle-body front-rear direction.

Further, in each of the above embodiments, the side-member connection portion 24 of the bumper reinforcement 22 is configured to project from the rear face of the bumper reinforcement 22 toward the vehicle-body rear side. However, the present invention is not limited to this, and the side-member connection portion may be configured to be provided on the rear face of the bumper reinforcement.

In addition, the present invention can be performed with various modifications without departing from a gist of the invention. Further, it is needless to say that a scope of the present invention is not limited to each of the above embodiments.

What is claimed is:

1. A vehicle body front structure comprising:
   a front side member disposed on a side portion of a vehicle body front portion such that longitudinal direction of the front side member is in coincidence with a vehicle-body front-rear direction, the front side member being provided with an impact absorption portion in a front part of its body portion, the impact absorption portion being vulnerable in a vehicle-body front-rear direction;

a bumper reinforcement disposed on the vehicle body front portion such that longitudinal direction of the bumper reinforcement is in coincidence with a vehicle-body width direction, the bumper reinforcement being fixed to a front end of the front side member;

a first load transmission member projecting outwardly in the vehicle-body width direction from the front side member, at a vehicle-body rear side of the impact absorption portion, the first load transmission member is formed in a right angled triangle in a plane view; and a second load transmission member projecting outwardly in the vehicle-body width direction from the front side member, at a vehicle-body front side of the impact absorption portion.

2. The vehicle body front structure according to claim 1, wherein:

the second load transmission member includes a fixed portion fixed to a side-member connection portion provided in the bumper reinforcement and the impact absorption portion so as to be sandwiched between the side-member connection portion and the impact absorption portion.

3. The vehicle body front structure according to claim 2, wherein:

the second load transmission member includes a load transmission portion provided outwardly in the vehicle-body width direction relative to the fixed portion, the load transmission portion being set longer in a size in the vehicle-body front-rear direction than the fixed portion.

4. The vehicle body front structure according to claim 3, wherein:

the second load transmission member includes an intermediate portion provided between the fixed portion and the load transmission portion so as to connect the fixed portion and the load transmission portion, the intermediate portion having a rigidity set lower than that of the load transmission portion.

5. The vehicle body front structure according to claim 4, wherein:

the vehicle body front structure is configured to form a gap between the load transmission portion and the front side member.

6. The vehicle body front structure according to claim 1, wherein:

a rear face of the first load transmission member is inclined so as to be facing toward the vehicle-body rear side as the rear face of the first load transmission member goes inwardly in the vehicle-body width direction.

7. A vehicle body front structure comprising:

a front side member disposed on a side portion of a vehicle body front portion such that longitudinal direction of the front side member is in coincidence with a vehicle-body front-rear direction, the front side member being provided with an impact absorption portion in a front part of its body portion, the impact absorption portion being vulnerable in the vehicle-body front-rear direction;

a bumper reinforcement disposed on the vehicle body front portion such that longitudinal direction of the bumper reinforcement is in coincidence with a vehicle-body width direction, the bumper reinforcement being fixed to a front end of the front side member;

a first load transmission member projecting outwardly in the vehicle-body width direction from the front side member, at a vehicle-body rear side of the impact absorption portion; and a second load transmission member projecting outwardly in the vehicle-body width direction from the front side member, at a vehicle-body front side of the impact absorption portion, the second load transmission member includes a fixed portion and a load transmission portion, the fixed portion is fixed to a side-member connection portion provided in the bumper reinforcement and the impact absorption portion so as to be sandwiched between the side-member connection portion and the impact absorption portion, the load transmission portion is provided outwardly in the vehicle-body width direction relative to the fixed portion, the load transmission portion being set longer in a size in the vehicle-body front-rear direction than the fixed portion.

8. The vehicle body front structure according to claim 7, wherein:

the second load transmission member includes an intermediate portion provided between the fixed portion and the load transmission portion so as to connect the fixed portion and the load transmission portion, the intermediate portion having a rigidity set lower than that of the load transmission portion.

9. The vehicle body front structure according to claim 8, wherein:

the vehicle body front structure is configured to form a gap between the load transmission portion and the front side member.

* * * * *